May 12, 1942.  W. A. KASUSKE  2,282,727
GREASE GUN FILLER
Filed Jan. 29, 1940
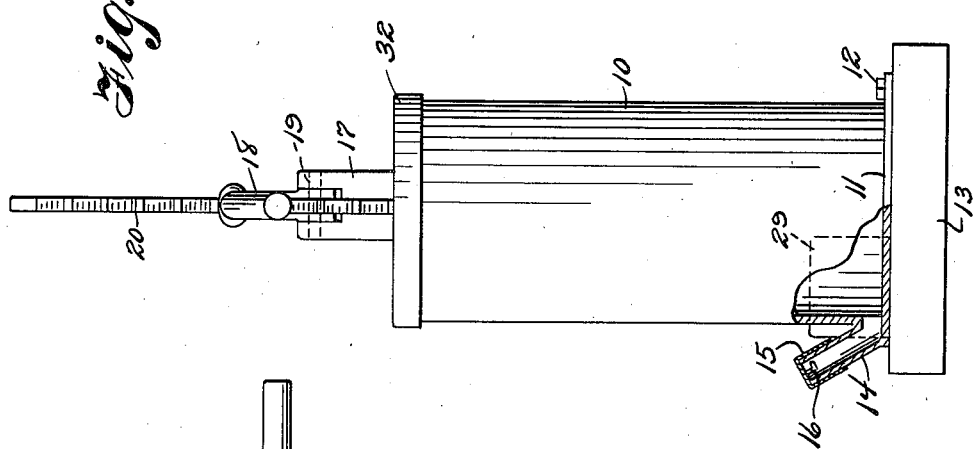
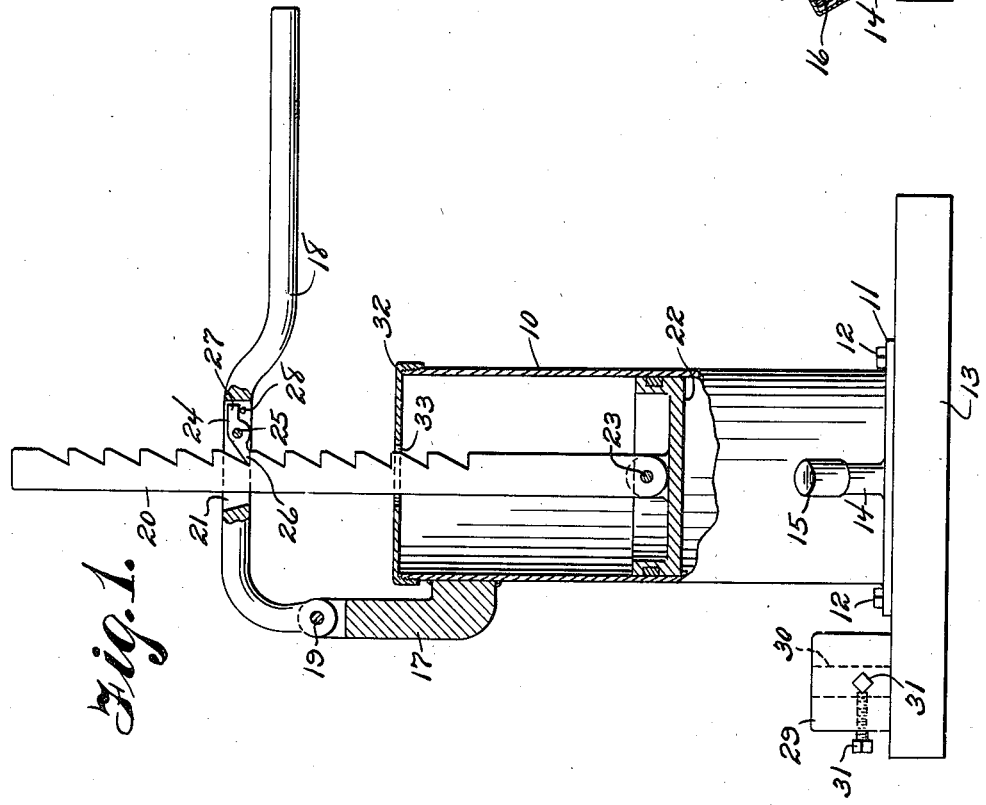
William A. Kasuske
INVENTOR
BY Victor J. Evans & Co.
ATTORNEYS Patented May 12, 1942

2,282,727

UNITED STATES PATENT OFFICE 2,282,727

GREASE GUN FILLER

William A. Kasuske, Twin Brooks, S. Dak.

Application January 29, 1940, Serial No. 316,275

2 Claims. (Cl. 221—47.5)

This invention relates to grease gun fillers and has for an object to provide a device of this character which is portable and may be used to fill grease guns for greasing machinery while at work in the fields without requiring the use of tools or skilled labor.

A further object is to provide a device of this character which will employ a grease container and a manually operable plunger therein for injecting grease ahead of the plunger into the bottom of the grease gun so that no air will remain in the grease gun when it is filled.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation, partly in section, of a grease gun filler constructed in accordance with the invention.

Figure 2 is a front elevation, partly in section, of the grease gun filler.

Referring now to the drawing in which like characters of reference designate similar parts in the various views, 10 designates a cylinder which is provided at its lower end with a flat base plate 11 which may be bolted as shown at 12 to a flat board 13 so that the cylinder may be set upright at any desired location. A grease gun filler tube 14 communicates with the bottom of the cylinder at the base plate and inclines upwardly and outwardly from the cylinder. The grease tube is normally closed by a screw cap 15 and is provided with a bayonet slot 16 which may be used to secure the grease gun to the tube for filling after the cap 15 is removed.

A bracket arm 17 is secured to the upper end of the wall of the cylinder and a manually operable lever 18 is pivotally secured on a pivot pin 19 carried by the upper end of the bracket.

A ratchet bar 20 passes loosely through an opening 21 in the lever 18 and extends downwardly into the cylinder 10. A plunger 22 is mounted in the cylinder and is secured to the lower end of the ratchet bar by a pivot pin 23. A pawl 24 is pivoted intermediate its ends on a pivot pin 25 which extends transversely through the opening 21 in the lever. One end 26 of the pawl engages the ratchet bar and the other end 27 engages a stop pin 28 disposed in the opening 21.

When the handle lever 18 is manually depressed at the outer end, the pawl will engage a ratchet tooth of the ratchet bar and move the bar downwardly to urge the plunger downwardly for ejecting grease from the cylinder into the grease cup. When the free end of the lever is elevated, the pawl rides freely up on the ratchet teeth ready for the next operation.

A grease gun holder 29 in the nature of a rectangular block of material is provided with an axial opening 30 to receive the grease gun when it is not in use. A pair of set screws 31 are disposed transversely in the block and enter the opening 30 to hold the cap of the grease gun while it is being unscrewed from the grease gun preparatory to the grease gun being applied to the filler tube 14.

The cylinder 10 is provided with a flange cap 32 which is screw threadedly engaged with the top of the cylinder. An opening 33 is formed in the cap 32 to receive the ratchet bar 29 and guide the same in its reciprocatory movements.

Since the operation of the device has been described as a description of the parts progressed, it is thought the invention will be fully understood without further explanation.

What is claimed is:

1. A grease gun filler, comprising a cylinder, a grease gun filler tube communicating with the lower end of the cylinder, a cap closing the upper end of the cylinder and provided with a slot, a piston in the cylinder, a piston rod pivotally connected to the piston and extending through the opening in the cap and provided with ratchet teeth, a bracket arm secured to one side of the cylinder and extending upwardly above the cylinder, an operating lever having a downwardly turned end pivotally connected to the upper end of the bracket, and an opening through which the piston rod passes, and a pivoted pawl adapted to engage the ratchet teeth of the piston rod.

2. A grease gun filler, comprising a cylinder, a grease gun filler tube communicating with the lower end of the cylinder, a cap closing the upper end of the cylinder and provided with a slot, a piston in the cylinder, a piston rod pivotally connected to the piston and extending through the opening in the cap and provided with ratchet teeth, a bracket arm secured to one side of the cylinder and extending upwardly above the cylinder, an operating lever having a downwardly turned end pivotally connected to the upper end of the bracket, said lever having an elongated slot through which the piston rod passes, a pawl pivoted wholly within said slot and engaging the ratchet teeth on the piston rod, and a transverse pin passing through the slot and engaging the pawl to prevent the upward movement thereof upon the downward movement of the operating lever.

WILLIAM A. KASUSKE.